United States Patent [19]

Hori

[11] 3,761,606

[45] Sept. 25, 1973

[54] COLOR TELEVISION RECEIVER FOR USE IN PAL SYSTEM

[75] Inventor: Harunobu Hori, Takatsuki, Japan

[73] Assignee: Matsushita Electric Industrial Co., Ltd., Osaka, Japan

[22] Filed: Jan. 31, 1972

[21] Appl. No.: 222,191

[30] Foreign Application Priority Data

Feb. 10, 1971 Japan .................. 46/5770
June 18, 1971 Japan .................. 46/44341
June 18, 1971 Japan .................. 46/44342

[52] U.S. Cl. .................. 178/5.4 P, 178/5.4 SD
[51] Int. Cl. .................. H04n 9/38
[58] Field of Search .................. 178/5.4 P, 5.4 SD, 178/5.4 SY, 5.2 A

[56] References Cited

FOREIGN PATENTS OR APPLICATIONS 1,118,465 7/1968 Great Britain .................. 178/5.4 P

*Primary Examiner*—Robert L. Griffin
*Assistant Examiner*—Marc E. Bookbinder
*Attorney*—Richard K. Stevens et al.

[57] ABSTRACT

A color television receiver for use in a PAL system comprising a demodulation circuit wherein means is provided for detecting the difference between the amplitude of the demodulated chrominance signal when a 180° phase-shift of the chrominance signal is effected and the demodulated chrominance signal when there is no phase shift effect. The demodulation axis is phase-controlled by the detected difference so as to greatly reduce the distortion of the hue and saturation of the reproduced color images.

6 Claims, 12 Drawing Figures

PATENTED SEP 25 1973 3,761,606

SHEET 3 OF 7

COLOR TELEVISION RECEIVER FOR USE IN PAL SYSTEM

The present invention relates to color television receivers for use in the PAL system and more particularly to demodulation circuits for such color television receivers.

There have been proposed various kinds of demodulation circuits for PAL system television signals. In one of the most currently used demodulation techniques, one horizontal scanning line of the chrominance signal is combined with the preceding horizontal scanning line of the chrominance signal, the said preceding chrominance signal having been delayed for one horizontal scanning line period, and such combined signals are used to reproduce each color picture element with reduced phase distortion. However, this technique requires a television receiver provided with an expensive delay line.

The present invention is intended to provide a novel color television receiver for use in the PAL system which dispenses with such an expensive delay line.

In accordance with the present invention, there is provided a color television receiver adapted to receive a television signal which includes a chrominance signal formed by quadrature-amplitude modulation of a carrier wave with two color signals, one of the modulation axes being changed by 180° for alternate line periods of the video signal characterized by a demodulation circuit which includes first means for detecting the difference between the amplitude of the demodulated chrominance signal during the periods when one of the modulation axes is being phase-shifted by 180° and that of the chrominance signal for the periods not phase-shifted, second means for generating a phase error correction signal in response to the detected difference and third means for controlling the phasic relation between the chrominance signal and a reference oscillation demodulating the chrominance signal.

Embodiments of the present invention will now be described, by way of example, with reference to the accompanying drawings, in which.

Figure 5:
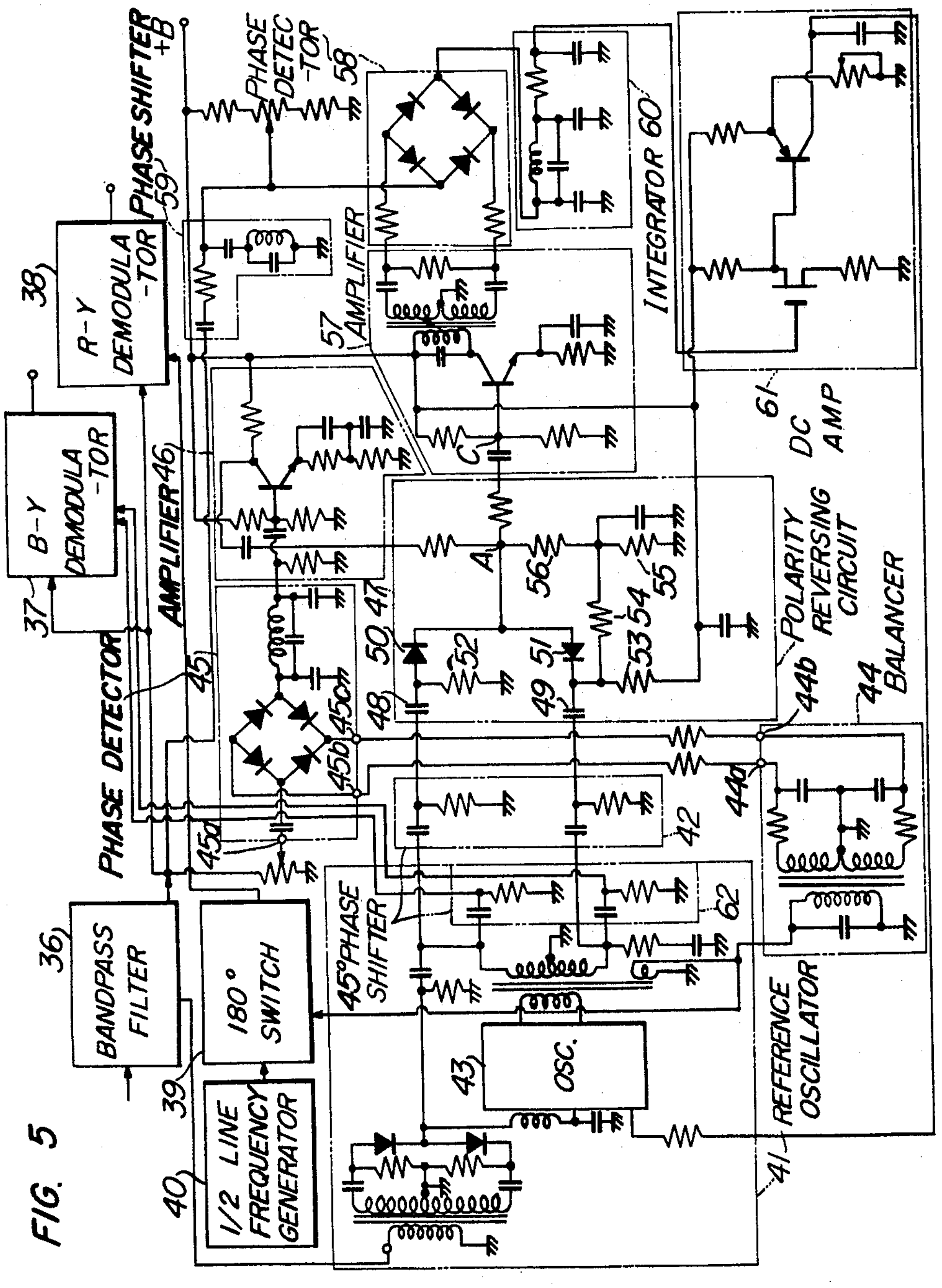
FIG. 5 is a detailed circuit diagram of another embodiment of the present invention.
Figure 7:
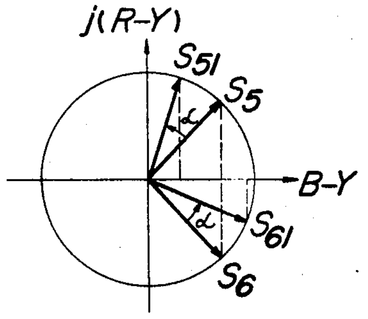
Figure 8:
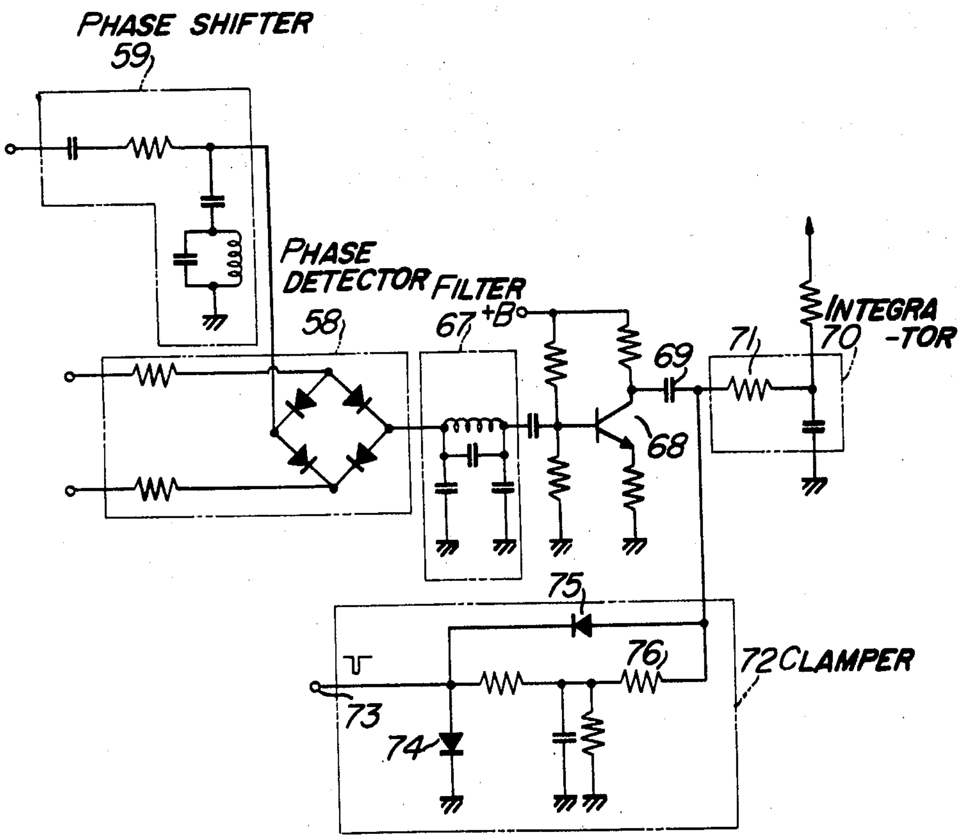
Figure 9:
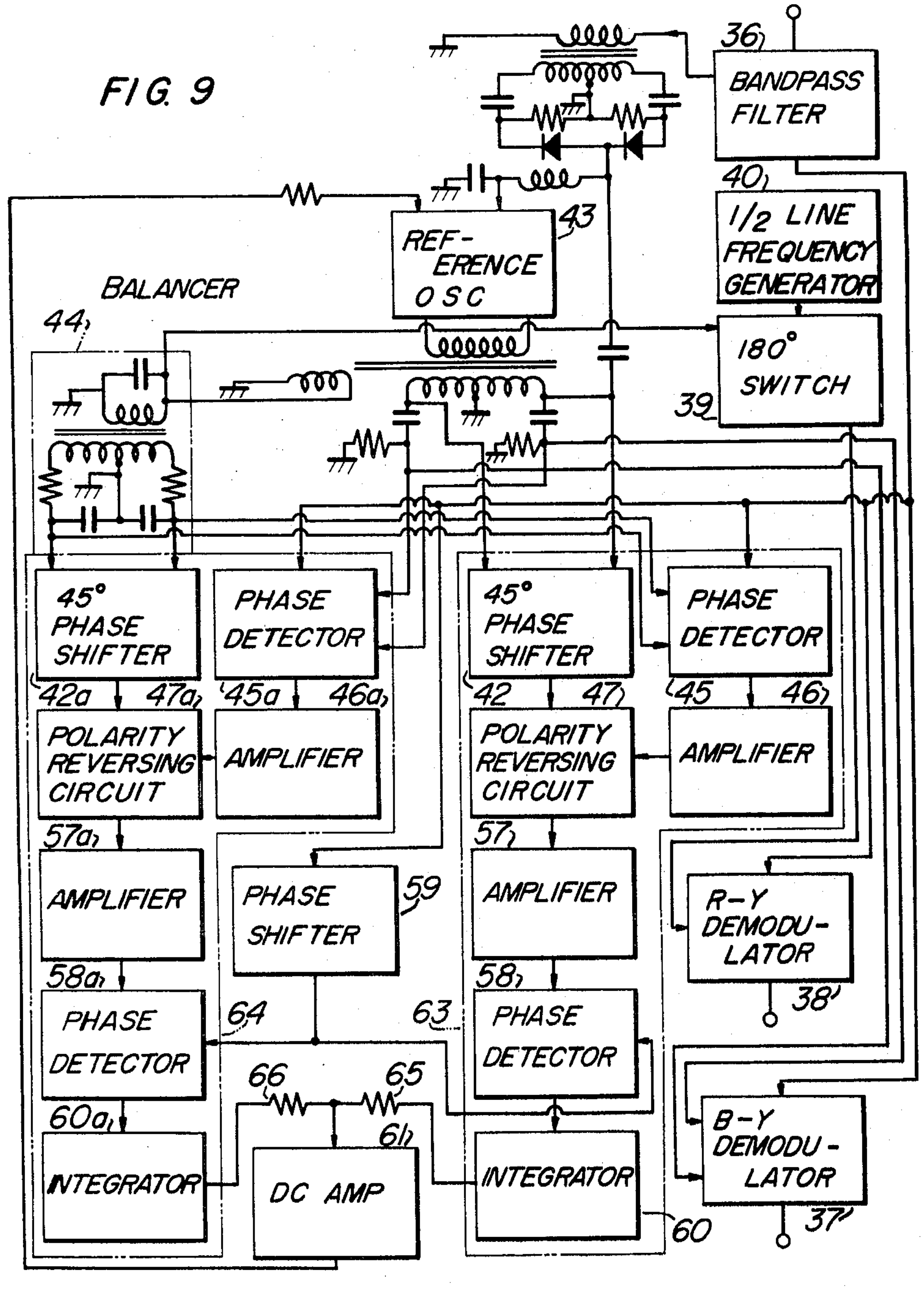

FIGS. 6*a* – 6*d* some waveforms useful for explaining the operation of the circuit diagram of FIG. 5;

FIG. 7 is a vector diagram in connection with the circuit diagram of FIG. 5;

FIG. 8 is a circuit diagram showing a modification of a part of the circuit diagram of FIG. 5 in accordance with the present invention; and FIG. 9 is a circuit diagram of another embodiment of the present invention.

Figure 3:
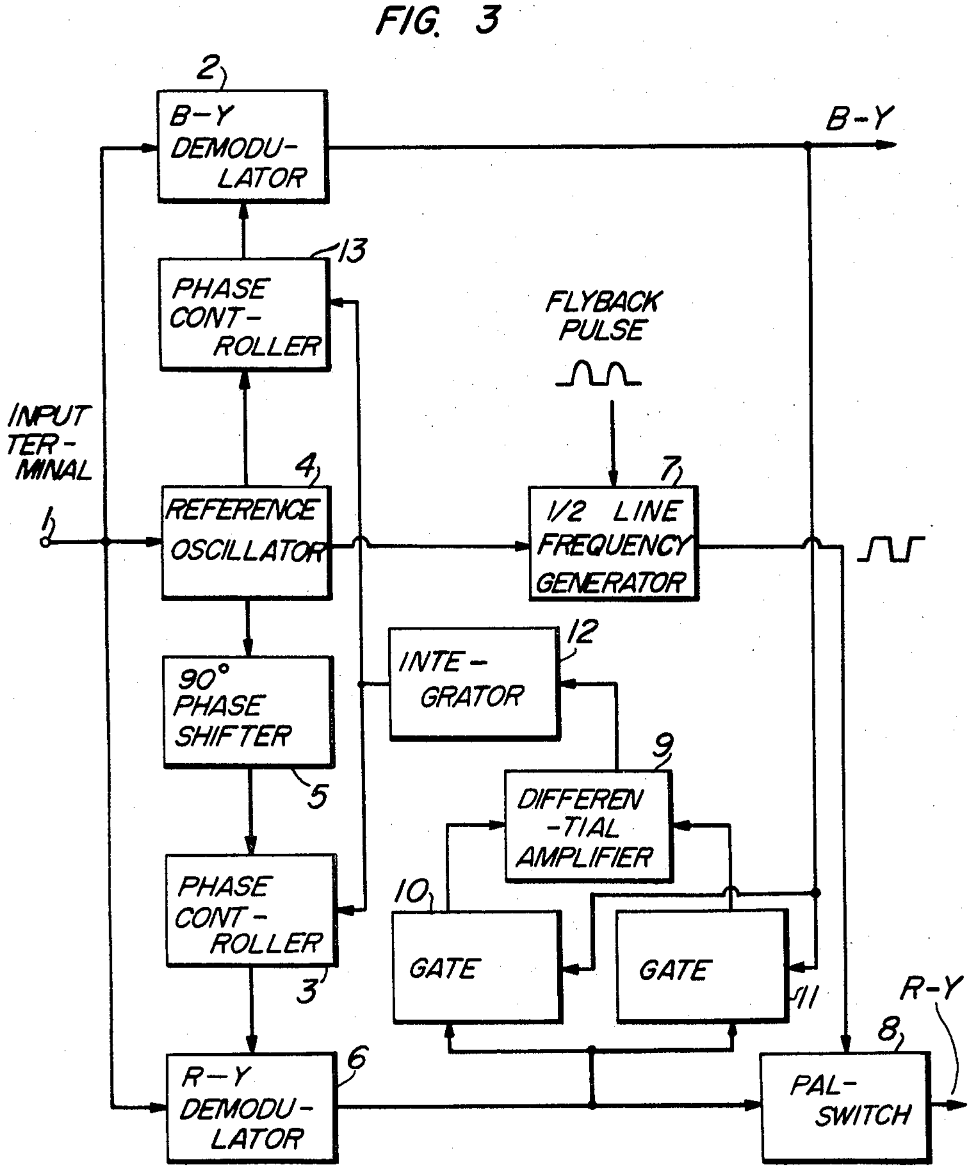
FIG. 3 is a block diagram of a demodulation circuit for PAL system color television receiver, embodying the present invention.

Referring to FIG. 3 showing a block diagram of a color information demodulation circuit in accordance of the invention, a chrominance signal is fed to an input terminal 1 having undergone carrier suppression modulation with two color signals by means of the quadrature modulation, the input terminal being connected with a (B-Y) demodulator 2, and (R-Y) demodulator 6 and a reference oscillator (automatic phase control circuit) 4. A reference oscillation from the reference oscillator 4 is supplied to the demodulator 2 through a phase controller 13 and is also supplied to the (R-Y) demodulator through a phase shifter 5 and another phase controller 3. A demodulated (R-Y) color difference signal delivered from the (R-Y) demodulator 6 is fed to gates 10 and 11 for the purpose of detecting any phasic error that may exist in the demodulated (R-Y) signal from the (R-Y) demodulator 6. Such phasic error is detected by means of demodulated (B-Y) color difference signal from the (B-Y) demodulator, as will be hereinafter described. The gates 10 and 11 are such that in accordance with the polarity of the (B-Y) signal, either one of them is conductive and the other is cut off. The outputs of the gates 10 and 11 are supplied to a differential amplifier 9, the output of which is then fed to both the phase controllers 13 and 3 through an integrator 12, thereby achieving phase control. The demodulated (R-Y) signal, being phase-inverted per one horizontal scanning line, is subjected to such a correction at a PAL-switch 8 that a sequence of horizontal scanning lines of signals of the same single polarity is obtained. The PAL-switch 8 is actuated by the output of a ½ line frequency generator 7 including a multivibrator which is driven by the output of a phase discriminator of the burst signal in the reference oscillator 4 and a flyback pulse. The thus reproduced (B-Y) and (R-Y) color difference signals are delivered to a matrix circuit (not shown) to obtain (B-Y) and (R-Y) signals to reproduce color images on the screen of a color picture tube.

Figure 1:
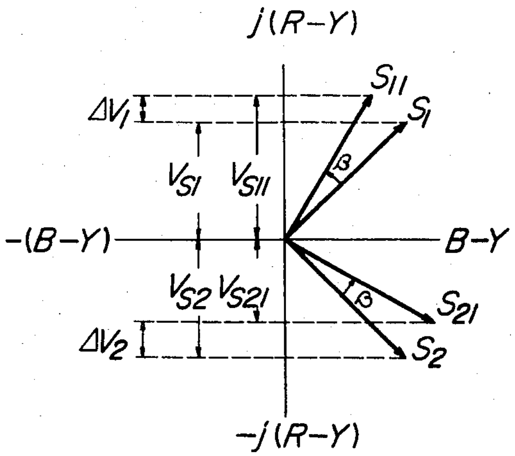
FIGS. 1 and 2 are vector diagrams for illustrating the present invention.

The operation of the circuit of FIG. 3 will next be described with reference to the vector diagrams of FIGS. 1 and 2. In FIG. 1 illustrating phase inversion of vectors, the two modulation axes (B-Y) and (R-Y) spaced 90° in phase form a chrominance signal vector $S_1$, the hue being represented by the phase of the chrominance signal vector $S_1$ determined with reference to (B-Y) signal or (B-Y) axis. Assuming that a phasic error caused in a transmission channel allows the chrominance signal vector $S_1$ to rotate an angle $\beta$ in the positive direction, the vector $S_1$ is changed to a vector $S_{11}$. By denoting on the $j$(R-Y) axis the demodulation outputs derived from the (R-Y) demodulator 6 corresponding to the vectors $S_1$ and $S_{11}$ as $V_{S1}$ and $V_{S11}$ respectively, the resulting phasic error output $\Delta V_1$ is $$V_{S11} - V_{S1} = \Delta V_1 .$$

Due to this phasic error, the (R-Y) output is changed by $\Delta V_1$ in the positive direction. During the next succeeding horizontal scanning, $j$(R-Y) component of the chrominance signal vector is inverted (phase-shifted by 180°) so as to be $-j$(R-Y) while (B-Y) component is maintained, thus the vector $S_1$ being shifted to $S_2$. As in the case of the previous horizontal scanning, the inverted vector $S_2$ is also allowed to rotate angle $\beta$ in the positive direction to be changed to $S_{21}$. By denoting on $-j$(R-Y) axis the demodulation outputs derived from the (R-Y) demodulator 6 corresponding to the vectors $S_2$ and $S_{21}$ as $V_{S2}$ and $V_{S21}$, the resulting phasic error output $\Delta V_2$ is $$-(V_{S21} - V_{S2}) = \Delta V_2$$

Due to this phasic error, the $-j$(R-Y) output is changed by $\Delta V_2$ in the positive direction. Since adjacent horizontal scanning lines carry almost the same information, $\Delta V_1$ and $\Delta V_2$ are substantially identical with each other in magnitude and polarity. By integrating $V_{S11}$ and $V_{S21}$ at the same integrator 12 having a time constant which may be identical with a period corresponding to from three horizontal scanning lines to a few fields, their mean value is given as $\Delta V_1 + \Delta V_2$. Thus, the mean value is zero when no phasic error exists, is positive when the phasic error is in the positive direction and is negative when the phasic error is in the negative direction. The explanation so far made is applicable to the case where the chrominance signal vectors are in the first and the fourth quadrants as shown in FIG. 1.

Figure 2:
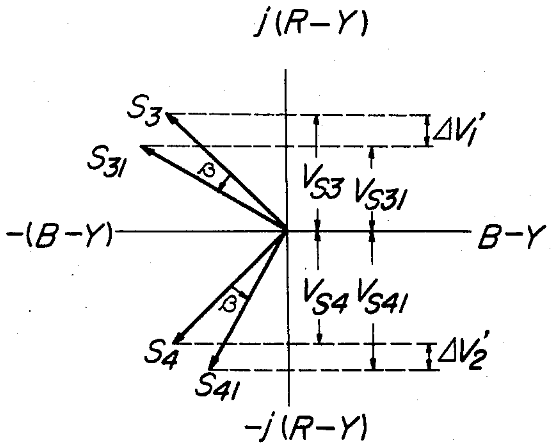

In FIG. 2 where chrominance signal vectors are in the second and the third quadrants, the opposite phenomena take place with respect to the above explanation. Although the mean value becomes zero when no phasic error exists, the mean value is negative when the phasic error is in the positive direction but is positive when the phasic error is in the negative direction.

The gate 10 operates to conduct $V_{S11}$ and $V_{S21}$ shown in FIG. 1 while the gate 11 operates to conduct $V_{S31}$ and $V_{S41}$ shown in FIG. 2. The differential amplifier 9 delivers an output which is opposite in polarity to one of the outputs of the gates 10 and 11. The phasic errors as represented in FIG. 1, i.e., those in the first and the fourth quadrants in the vector diagram and the phasic errors as represented in FIG. 2, i.e., those in the second and the third quadrants are separated by the gates 10 and 11 from each other by means of a demodulated (B-Y) signal, and the respective phasic errors are detected by the differential amplifier 9 as an error output of the same single polarity. When $V_{S11}$ and $V_{S21}$ are subsequently supplied to the differential amplifier 9, the error in the demodulation amount is delivered as a corresponding DC error output from the integrator 12, which in turn is supplied to the phase controllers 13 and 3. The outputs of the phase controllers 3 and 13 are used to adjust the phases of the demodulation axes for synchronous detection by the (R-Y) demodulator 6 and (B-Y) demodulator 2 respectively. Namely, the phase controllers 3 and 13 operate, in response to the output of the differential amplifier 9 fed thereto through the integrator 12, to make $\Delta V_1$ and $\Delta V_2$ zero so that the mean output of the differential amplifier is zero. In this way, the phases of the reference oscillations fed to the (R-Y) demodulator 6 and (B-Y) demodulator 2 are controlled for synchronous detection, using the phasic error signal derived from the integrator 12 and representative of the phasic error caused in the transmission channel so that the hue and the saturation of reproduced images may be with a highly fidelity.

Figure 4:
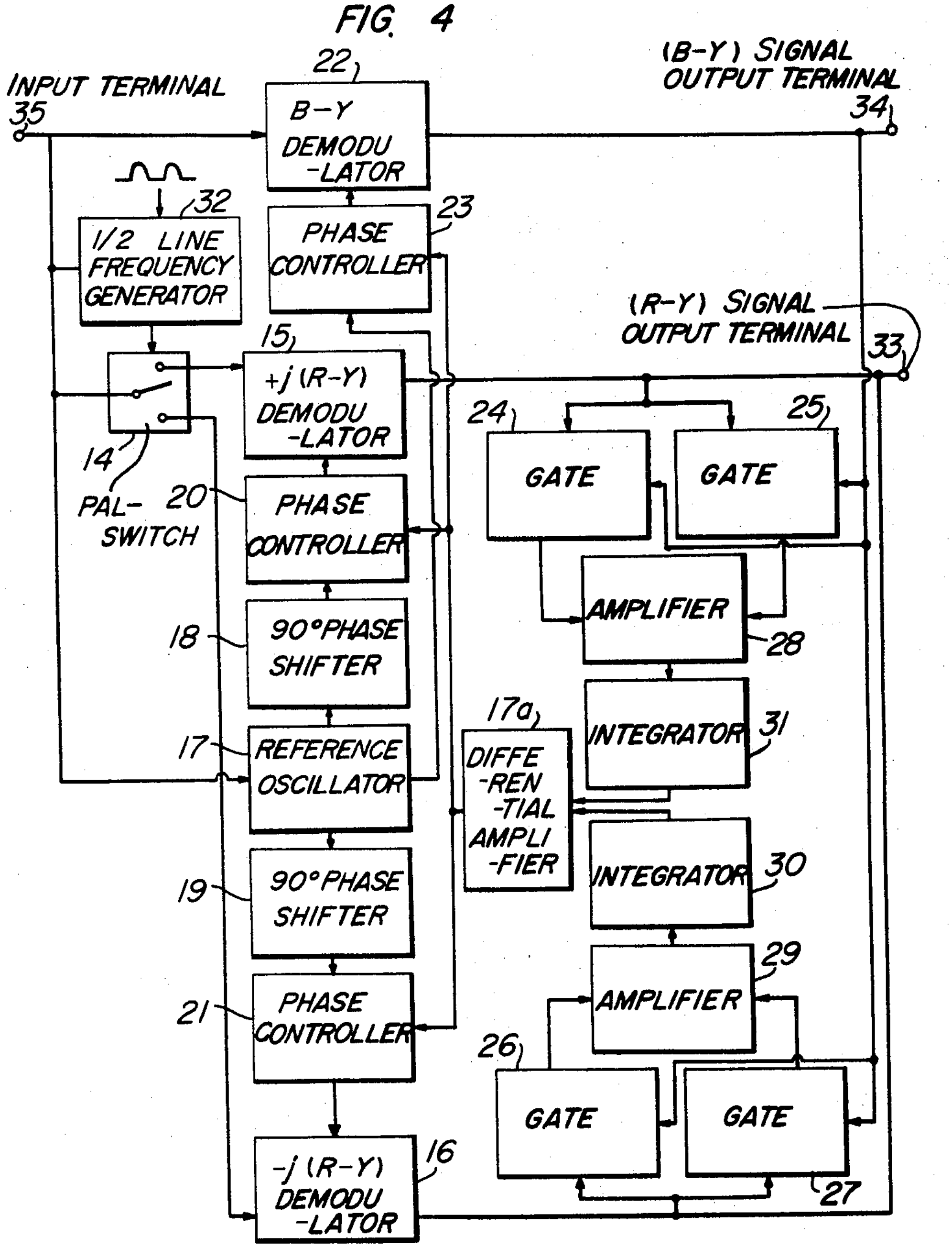
FIG. 4 is a block diagram of another embodiment of the present invention.

FIG. 4 shows a block diagram of a demodulation circuit in accordance with another embodiment of the present invention, wherein a 180°-switched chrominance signal and the other (not switched) chrominance signal are separately demodulated. The chrominance signal appearing at the input terminal 35 is fed to $+j$(R-Y) demodulator 15 when not 180°-switched and is fed to $-j$(R-Y) demodulator 16 when 180°-switched, one of the modulation axes of the chrominance signal being 180°-switched at every other horizontal scanning line. For this purpose, the input chrominance signal is switched by a PAL-switch 14 which is actuated by a ½ line frequency generator 32. Here in this demodulation circuit, $V_{S11}$, $V_{S31}$ and $V_{S21}$, $V_{S41}$ of FIG. 1 and FIG. 2 are separately amplified by amplifiers 28 and 29, integrated by integrators 30 and 31, and then both of them are fed to a differential amplifier 17*a* to be compared with each other. The output of the differential amplifier 17*a* is used for phase control as in the case of FIG. 3. This demodulation circuit is particularly advantageous in that drift and dependency of the circuit on changes of the ambient temperature are much reduced, and therefore has a stabilized operation characteristic. The arrangement of the circuit is somewhat different from that of FIG. 3. To the demodulators 15 and 16 are fed reference oscillations from a reference subcarrier generator 17 through 90°-phase shifters 18 and 19 and through phase controllers 20 and 21, while to (B-Y) demodualtor 22 is fed a reference oscillation from the reference oscillator 17 through another phase controller 23. Each of the phase controllers is supplied with the output of the differential amplifier 17*a*. For the demodulators 15 and 16 there are provided gates 24, 25 and 26, 27 (corresponding to the gates 10, 11 of FIG. 3), amplifiers 28, 29 (corresponding to the amplifier 9 of FIG. 3), and integrators 31, 30 (corresponding to the integrator 12 of FIG. 3). Thus, an error in the demodulation output is derived not from the integrators 30 and 31 but from the differential amplifier 17*a*. Reference numerals 35, 33 and 34 denote an input terminal, an (R-Y) signal output terminal of the demodulation circuit and a (B-Y) signal ouput terminal, respectively.

Figure 6A:
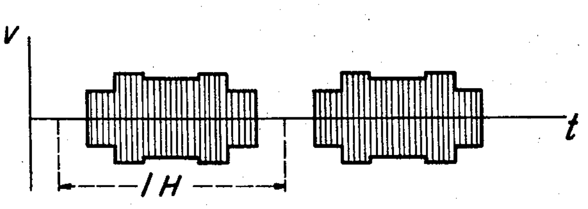
Figure 6B:
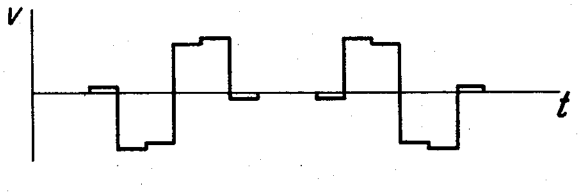
Figure 6C:
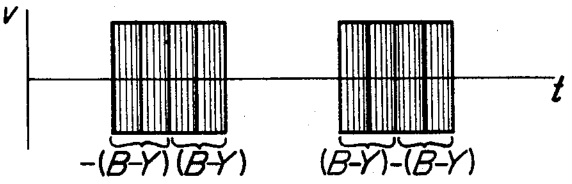
Figure 6D:
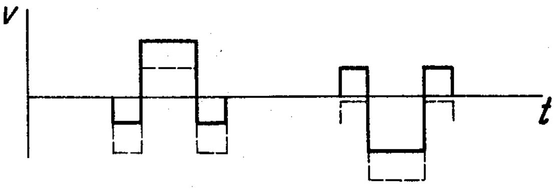

In FIG. 5 showing a detailed circuit diagram of another embodiment of the present invention, reference numeral 36 denotes a bandpass filter the output of which is fed for demodulation to a (B-Y) demodulator 37 and to an (R-Y) demodulator 38 while reference numeral 39 denotes 180°-switch circuit to which the output of a ½ line frequency generator 40 is supplied. A reference oscillation is supplied from a reference oscillator 41 to a 45°-phase shifter 42 and is phase-shifted by 45° thereat. A portion of the reference oscillation from the oscillator 41 is phase-shifted by 45°-phase shifter 62 and fed to the (B-Y) demodulator 37 for demodulating a (B-Y) signal. Another output of the oscillator is switched by 180° for every one horizontal scanning at the 180°-switch 39 driven by the generator 40. The reference oscillator 41 includes an oscillator 43. Reference numeral 44 denotes a balancer generating at its output terminals 44*a* and 44*b* reference oscillations 180° out of phase to each other which are in turn fed to input terminals 45 *b* and 45*c* of a phase detector 45. Another input terminal 45*a* of the detector 45 receives the output of the bandpass filter 36. The output of the phase detector 45 is amplified by an amplifier 46 the output of which is connected to point A of a polarity reversing circuit 47. Assuming that the waveform of the chrominance signal passing through the bandpass filter 36 is such as shown in FIG. 6*a*, the above-mentioned output of the amplifier 46 is i.e., (R-Y) signal and −(R-Y) signal are in such a waveform as shown in FIG. 6*b*. The two outputs of the phase shifter 42 are connected through capacitors 48 and 49 to diodes 50 and 51 respectively. The junction between the capacitor 48 and the diode 50 is grounded through a resistor 52, while that between the capacitor 49 and the diode 51 is connected through a resistor 53 to B+ power source. The B+ power source voltage is divided by resistors 53, 54 and 55, the voltage drop across the resistor 54 being applied to a series connection of the diode 51 and a resistor 56, and the voltage drop across the resistor 55 being applied to a series connection of the resistor 56, diode 50 and the resistor 52. The two outputs of the phase shifter 42 pass through the diodes 50 and 51 respectively and appear at a point A as an output of the polarity reversing circuit 47. The states of conduction of the diodes 50 and 51 are controlled by the output of the amplifier 46. The signal appearing at point C in such a waveform as shown in FIG. 6c, is fed to an amplifier 57 and is amplified thereby. The amplifier 57 is connected with a phase detector 58, which is also connected with a phase shifter 59, the phase shifter being supplied with a portion of the output of the bandpass filter 36. Thus, the output of the phase detector 58 being such as shown in FIG. 6d, is fed to an integrator 60 and is therefore integrated thereat to deliver the corresponding D.C. output signal. The integrator 60 has a time constant equal to a time period of about 3 – 7 fields, so that the operation of the demodulation circuit is greatly stabilized though correction of the phasic error can not be made for each horizontal scanning. The output of the integrator 60 is further passed for D.C. amplification through a D.C. amplifier 61 and is then fed back to the oscillator 43 of the reference oscillator 41, thereby properly controlling the phase of the oscillation to be delivered. By the provision of the D.C. amplifier 61 any adverse affect on the the error correction due to noise can be eliminated.

Suppose now that a phasic error $\alpha$ takes place in a chrominance signal supplied to the bandpass filter 36, as illustrated in FIG. 7 wherein $S_5$ and $S_6$ are chrominance signal vectors and $S_{51}$ and $S_{61}$ are those resulting from the above-mentioned phasic error. The vector $S_5$ appearing during one horizontal scanning is followed by the vector $S_6$ which appears during the next succeeding horizontal scanning, so that they are in the same relation as the vectors $S_1$ and $S_2$ are in FIG. 1. Existence of the phasic error $\alpha$ causes the output of the amplifier 46 to change, but no change is appreciated at point C. Meanwhile, since the output of the bandpass filter contains a phasic error, the phase detector 58 is affected thereby with a result that the output of the detector 58 is changed as shown by dotted lines in FIG. 6, view d. Accordingly, the output of the integrator 60. hence that of the D.C. amplifier 61 is also changed to control and adjust the reference oscillator 41 so that the demodulation axes of the demodulators 37 and 38 are turned by $\alpha$. It should be noted that although in the arrangement of FIG. 5 the chrominance signal on the (B-Y) demodulation axis is gated by means of demodulated (R-Y) signals, the same thing is true when (B-Y) signal and (R-Y) signal are interchanged.

When the phasic error $\alpha$ is large enough for the resulting vector $S_{61}$ to be near to or to be overlapped with or to exceed the (B-Y) axis, the sensitivity to such a large phasic error may be lowered which results in failure to obtain a desired phase control signal. Therefore, it is desirable that the phase control signal is not detected near the (B-Y) axis. To this end, the diodes 50 and 51 (FIG. 5) are supplied with reverse bias voltages obtained by dividing the B+ power source voltage by the resistors 53, 54 and 55. Thus, even with a large phasic error such as mentioned above, the magnitude of the demodulated signal as shown in FIG. 6b, being small, the diodes are not allowed to be conductive with a result that no output signal appears at point C and no abnormal voltage is detected.

It should be further noted that although in FIG. 5 the correction signal from the amplifier 61 is supplied to the oscillator 43, the correction signal may be supplied to a phase shifter provided to interconnect the bandpass filter 36 and the reference oscillation 41, thereby accomplishing phasic error correction or phase control, and that althrough in FIG. 5 the phase of the demodulation axis is adjusted for the phasic error correction, instead a phase shifter may be provided to be connected with the output of the bandpass filter 36 and the correction signal may be fed with the phase shifter to the same effect.

Referring now to FIG. 8 showing a modification of a part of the arrangement of FIG. 5, the integrator 60 and the D.C. amplifier 61 of FIG. 5 are replaced by a filter 67, an amplifier 68, a clamper 72 and an integrator 70. By this modification, the total demodulation circuit is further stabilized against temperature changes. In FIG. 5 arrangement, the output of the integrator 60 being small, if the temperature correction is considered, some difficulty might arise. In FIG. 8, however, no temperature correction circuit is required. The filter 67 is connected to the amplifying transistor 68, the collector of which is connected to the integrator 70 through a capacitor 69. To the junction between the capacitor 69 and a resistor 71 which constitutes the integrator 70 is connected the clamper 72 which may be of a known circuit construction. The clamper 72 operates to clamp the junction between the capacitor 69 and the resistor 71 to ground potential. For this purpose, input terminal 73 of the clamper 72 is supplied with a negative pulse signal having a period equal to that of the horizontal scanning so that diodes 74 and 75 are made conductive during the horizontal flyback time. During the horizontal scanning, the potential of the junction between the capacitor 69 and the resistor 71 is little changed and is maintained at the zero potential because the time constant which determines the discharging speed is large due to the high resistance of the resistor 76. By this clamping action, the provision of a D.C. ampliier such as the amplifier 61 shown in FIG. 6 is dispensed with.

Referring now to FIG. 9 showing another embodiment of the present invention, similar parts are denoted by the same reference numerals as in FIG. 5. Here in this embodiment, in addition to a circuit arrangement for gating the reference oscillation on the (B-Y) demodulation axis with the demodulated (R-Y) and –(R-Y) signals thereby obtaining a phasic error correction signal such as shown in FIG. 5, there is provided another circuit arrangement for gating the reference oscillation on the (R-Y) demodulation axis with the demodulated (B-Y) signal. According to this embodiment, it is possible to detect or obtain a phasic error correction signal even though the chrominance signal contains single color information which signal has a phase near the (B-Y) demodulation axis.

In FIG. 9, blocks 63 and 64 have the same construction. The respective constituents of the block 64 are denoted by the same reference numerals as those in block 63 which are however followed by characters *a*. Block 63 is a circuit arrangement for gating the reference oscillation on the (B-Y) demodulation axis with the (R-Y) signal demodulated by the detector 45 and the amplifier 46 while block 64 is a circuit arrangement for gating the reference oscillation on the (R-Y) demodulation axis wit the (B-Y) signal demodulated by the detector 45a and the amplifier 46a. The outputs of the integrators 60 and 60a are combined with each other through resistors 65 and 66 and the combination of the outputs is fed to and is amplified by the amplifier 61. Thus, phasic error correction is effected to the chrominance signal having any phase.

What we claim is:

1. A color television receiver for receiving television signal including a chrominance signal formed by quadrature amplitude modulation of a carrier wave with two color signals, one of the modulations axes being changed by 180° for alternate line periods of the video signal, the receiver comprising a circuit means for phase-detecting a chrominance signal with a first output of a reference oscillator to produce a first color signal, gate means for gating a second output of said reference oscillator with said first color signal, said second output for producing a second color signal, means for phase-detecting said chrominance signal with a gated oscillation delivered from said gate means, means for converting the output of the second-mentioned phase-detecting means into a corresponding D. C. signal and means for phase-controlling said reference oscillator with respect to said chrominance signal by means of the output of said converting means, said output of said converting means being representative of a difference in amplitude between the demodulated chrominance signal when a 180° change of the phase of the chrominance signal is effected and the demodulated chrominance signal when no 180° change of the phase of the chrominance signal is effected.

2. The color television receiver as claimed in claim 1, wherein said gate means includes means for phase-shifting said second output of said reference oscillator to produce as said second color signal two signals at output electrodes 180° out of phase to each other, diodes each having one end connected with different one of said output electrodes of said phase-shifting means, and other ends of said diodes being connected with each other, means for supplying said first color signal as a gate signal to the connection point between said diodes and means for applying bias voltages to said diodes so that said diodes are not conductive when said supplied gate signal is small.

3. A color television receiver for receiving a television signal including a chrominance signal formed by guadrature amplitude modulation of a carrier wave with two color signals, one of the modulation axes being changed by 180° for alternate line periods of the video signal, the receiver comprising circuit means for phase-detecting a chrominance signal with a first output of a reference oscillator to produce a first color signal, gate means for gating a second output of said reference oscillator with said first color signal, means for phase-detecting said chrominance signal with the output of said gate means to produce a first detected signal; another circuit means for phase-detecting said chrominance signal with a third output of said reference oscillator to produce a second color signal, said third output being derived from said second output, another gate means for gating said first output of said reference oscillator with said second color signal, another means for phase-detecting said chrominance signal with the output of said other gate means to produce a second detected signal, means for combining said first and second detected signals into a single detected signal and means for phase-controlling said reference oscillator with respect to said chrominance signal by means of the output of said combining means.

4. A color television receiver for receiving a television signal including a chrominance signal formed by guadrature amplitude modulation of a carrier wave with two color signals, one of the modulation axes being changed by 180° for alternate line periods of the video signal, the receiver comprising a pair of demodulators for alternatively demodulating a chrominance signal phase- shifted by 180° at every horizontal scanning reference oscillator means, the output of said reference oscillator means being fed to said demodulators, a pair of integrators for integrating the outputs of said pair of demodulators, means for combining the outputs of said pair of integrators into a single detected signal representative of a difference in amplitude between the demodulated chrominance signal when a 180° change of the phase of the chrominance signal is effected and the demodulated chrominance signal when no 180°-change of the phase of the chrominance signal is effected, and means for phase controlling said reference oscillator with respect to said chrominance signal by means of the output of said combining means.

5. The color television receiver as claimed in claim 1, wherein said converting means comprises an integrator having a time constant equal to a time period of about 3 – 7 fields.

6. A color television receiver for receiving a television signal including a chrominance signal formed by quadrature amplitude modulation of a carrier wave with two color signals, one of the modulation axes being changed by 180° for alternate line periods of the video signal, the receiver comprising a demodulator for demodulating a (B-Y) signal from said chrominance signal; a demodulator for demodulating an (R-Y) signal from said chrominance signal; a reference oscillator for demodulation; a phase controller interconnected between said reference oscillator and said (B-Y) demodulator; a 90°-phase shifter interconnected between said reference oscillator and another phase controller, said other controller being connected with said (R-Y) demodulator; a pair of gates to both of which the output of said (R-Y) demodulator is fed, said gates being driven by said (B-Y) demodulator so that their times of conduction are different from each other; a differential amplifier connected with said gates; and an integrator for integrating the output of said differential amplifier, said integrator being connected with said both phase controllers.

* * * * *

UNITED STATES PATENT OFFICE
CERTIFICATE OF CORRECTION

Patent No. 3,761,606 Dated September 25, 1973

Inventor(s) Harunobu HORI

It is certified that error appears in the above-identified patent and that said Letters Patent are hereby corrected as shown below:

Column 7, line 4, before "television" second occurrence insert -- a --.

line 7, change "modulations" to -- modulation --.

Column 8, line 11, correct the spelling of "quadrature".

line 17, before "reference" insert -- , --.

Signed and sealed this 9th day of July 1974.

(SEAL)
Attest:

McCOY M. GIBSON, JR.
Attesting Officer

C. MARSHALL DANN
Commissioner of Patents